United States Patent [19]
Lee et al.

[11] Patent Number: 5,129,367
[45] Date of Patent: Jul. 14, 1992

[54] INTERMITTENT BYPASS SYSTEM FOR A CHECK VALVE

[75] Inventors: Jordan R. Lee, Sterling Heights; Richard S. Davis, Romeo; Glen R. MacFarlane, Clarkston, all of Mich.

[73] Assignee: General Motors Corporation, Detroit, Mich.

[21] Appl. No.: 681,593

[22] Filed: Apr. 8, 1991

[51] Int. Cl.⁵ .................................. F02M 35/10
[52] U.S. Cl. .................................. 123/52 MF
[58] Field of Search ......... 123/52 M, 52 MB, 52 MV, 123/52 MC, 52 MF, 52 ML, 316

[56] References Cited

U.S. PATENT DOCUMENTS

| | | | |
|---|---|---|---|
| 3,810,454 | 5/1974 | Hunt | 123/587 |
| 3,935,842 | 2/1976 | Ishizawa et al. | 123/52 MF |
| 3,937,194 | 2/1976 | Tamaki et al. | 123/119 A |
| 3,995,609 | 12/1976 | Klomp | 123/188 UA |
| 4,158,352 | 6/1979 | Blatter | 123/585 |
| 4,232,641 | 11/1990 | Curtil | 123/76 |
| 4,254,747 | 3/1981 | Sumiyoshi et al. | 123/52 M |
| 4,356,798 | 11/1982 | Sakaoka et al. | 123/52 MF |
| 4,409,949 | 10/1983 | Tanaka et al. | 123/571 |
| 4,422,416 | 12/1983 | Bernardoni | 123/52 MF |
| 4,494,506 | 1/1985 | Hayama et al. | 123/348 |
| 4,512,152 | 4/1985 | Asaba | 60/601 |
| 4,517,947 | 5/1985 | Nishikawa et al. | 123/489 |
| 4,628,880 | 12/1986 | Aoyama et al. | 123/52 M |
| 4,760,703 | 8/1988 | Minami et al. | 60/605.1 |
| 4,773,358 | 9/1988 | Heath | 123/58 R |
| 4,890,582 | 1/1990 | Schatz et al. | 123/26 |
| 4,928,639 | 5/1990 | Schatz | 123/52 MF |
| 4,932,378 | 6/1990 | Hitomi et al. | 123/432 |
| 4,986,225 | 1/1991 | Wu et al. | 123/52 MF |
| 4,991,547 | 2/1991 | Davis et al. | 123/52 MF |
| 5,009,199 | 4/1991 | MacFarlane | 123/52 MF |
| 5,018,486 | 5/1991 | Davis et al. | 123/52 MF |

FOREIGN PATENT DOCUMENTS

| | | |
|---|---|---|
| 0271130 | 6/1988 | European Pat. Off. |
| 0344780 | 11/1989 | European Pat. Off. |
| 164773 | 5/1989 | India |
| 58-008230 | 1/1983 | Japan |
| 58-210322 | 12/1983 | Japan |
| 0017226 | 1/1985 | Japan ............ 123/52 MB |
| 63-094027 | 4/1988 | Japan |
| 0889878 | 12/1981 | U.S.S.R. |
| 2136501 | 9/1984 | United Kingdom |
| 2215817 | 6/1989 | United Kingdom |
| 90/02869 | 3/1990 | World Int. Prop. O. |
| 91/05152 | 4/1991 | World Int. Prop. O. |

OTHER PUBLICATIONS

"Alfa Romeo", Automotive Engineering, vol. 96, No. 11, Nov. 1988, pp. 109–110.
"Improving the Torque Characteristic of a Small Four (List continued on next page.)

*Primary Examiner*—David A. Okonsky
*Attorney, Agent, or Firm*—Gordon F. Belcher

[57] ABSTRACT

An intermittent bypass system comprises an intake conduit including an intake passage leading to a cylinder in an engine and an intake controller connected to the intake passage adjacent to the cylinder. The intake controller enables, during different portions of the engine cycle, fluid flow from the intake passage into the cylinder, fluid back-flow from the cylinder into the intake passage, and obstruction of fluid flow between the intake passage and the cylinder. A check valve is located in the intake passage upstream of the intake controller with the check valve allowing fluid flow toward the cylinder and obstructing fluid back-flow in the reverse direction. A bypass port is located on the intake passage to provide a flow path to a downstream portion defined by the portion of the intake passage between the check valve and intake controller. A control valve is connected between a secondary fluid source and the bypass port enabling communication between the secondary fluid source and downstream portion during a portion of the engine cycle when the check valve is open. The control valve obstructs the communication during a portion of the engine cycle when the check valve is closed.

6 Claims, 1 Drawing Sheet

OTHER PUBLICATIONS

Stroke Four Cylinder Engine By Using Reed Valves in the Intake Manifold", SAE Technical Paper Series 890222, Feb. 27, 1989.

"The Effects of Load Control with Port Throttling at Idel-Measurements and Analyses", SAE Technical Paper Series 890679, 1989.

"A Stratified Charging Two-Stroke Engine for Reduction of Scavenged-Through Losses", SAE Technical Paper Series 891805, Sep. 11-13, 1989.

"Reduction of Fresh Charge Losses by Selective Exhaust Gas Recirculation (SEGR) in Two-Stroke Engines", SAE Technical Paper Series 891806, Sep. 11, 1989.

"1990 Corvette Service Manual", General Motors Corporation, Jan. 1990, Driveability and Emissions 5.7L (VIN 8), pp. 6E3-C3-1-6E3-C3-4.

INTERMITTENT BYPASS SYSTEM FOR A CHECK VALVE

TECHNICAL FIELD

This invention relates to an intermittent bypass system for a check valve located in an intake passage leading to a cylinder of an engine, the intermittent bypass system including a control valve means enabling communication between a secondary fluid source and the intake passage downstream of the check valve during a predetermined portion of an engine functional cycle.

BACKGROUND

A check valve can be located in an intake passage leading to a cylinder in an engine to obstruct back-flow of fluid out of the cylinder into the intake passage. In such an arrangement, a downstream portion is defined by the portion of the intake passage between the check valve and cylinder.

A secondary passage can be connected to a bypass port formed on the intake passage between the check valve and cylinder to allow communication between the downstream portion and a secondary fluid source. Such communication can improve engine performance if properly controlled.

For example, such a secondary passage can enable a secondary air flow into the downstream portion. This can result in a reduction in the air flow which must pass through the check valve since a portion of the air flow can bypass the check valve and flow into the cylinder via the secondary passage and downstream portion. The reduction in pressure of the fluid flow caused by its passage through the check valve can therefore be reduced since the pressure reduction is proportional to the quantity of fluid flow through the check valve.

Reducing the fluid flow through the check valve can also result in a reduction in the required size of the check valve. A reduction in the check valve size can result in improved durability and frequency response of the check valve. Also, a reduction in the check valve size can reduce the space required in the engine to mount the check valve. This can allow the check valve to be mounted closer to the cylinder thereby reducing the size of the downstream portion.

Such a secondary passage can, however, allow a portion of the fluid which flows back into the downstream portion from the cylinder to bypass the check valve and exit the downstream portion via the secondary passage. The obstruction provided by the check valve to fluid flow from the cylinder back into the downstream portion is thereby limited.

SUMMARY OF THE INVENTION

The present invention provides an intermittent bypass system comprising an intake conduit including an intake passage leading to a cylinder in an engine and an intake control means connected to the intake passage adjacent to the cylinder. The intake control means enables, during different portions of an engine functional cycle, flow from the intake passage into the cylinder, fluid back-flow from the cylinder into the intake passage, and obstruction of fluid flow between the intake passage and the cylinder. A check valve is located in the intake passage upstream of the intake control means with the check valve allowing fluid flow toward the cylinder and obstructing fluid back-flow in the reverse direction. A bypass port is located on the intake passage to provide a flow path to a downstream portion defined by the portion of the intake passage between the check valve and intake control means.

The intermittent bypass system further comprises a control valve means connected between a secondary fluid source and the bypass port. The secondary fluid source comprises a portion of the intake conduit upstream of the check valve. The control valve means enables communication between the secondary fluid source and downstream portion during a portion of the engine functional cycle when the check valve is open. The control valve means obstructs the communication during a portion of the engine functional cycle when the check valve is closed.

The ability of the control valve means to allow and obstruct the communication during predetermined portions of the engine functional cycle can result in a number of improvements in engine performance. For example, if the communication is allowed when the pressure in the secondary fluid source is greater than the pressure in the downstream portion, a secondary fluid flow can be provided via the control valve means to the downstream portion. Reductions in the size of the check valve and in the pressure drop produced by the check valve can therefore be realized. If the communication between the downstream portion and secondary fluid source is obstructed when fluid is flowing from the cylinder back into the downstream portion, loss of fluid from the downstream portion through the secondary passage can be reduced.

These and other features and advantages of the invention will be more fully understood from the following description of certain specific embodiments of the invention taken together with the accompanying drawings.

BRIEF DRAWING DESCRIPTION

In the drawings:
FIG. 1 is a schematic view showing the intermittent bypass system of the present invention connected to an engine; and
FIG. 2 is a graph showing the opening, of some of the valves shown in FIG. 1 during an engine functional cycle.

Corresponding reference characters indicate corresponding parts throughout the several views of the drawings.

DETAILED DESCRIPTION

Figures 1, 2:
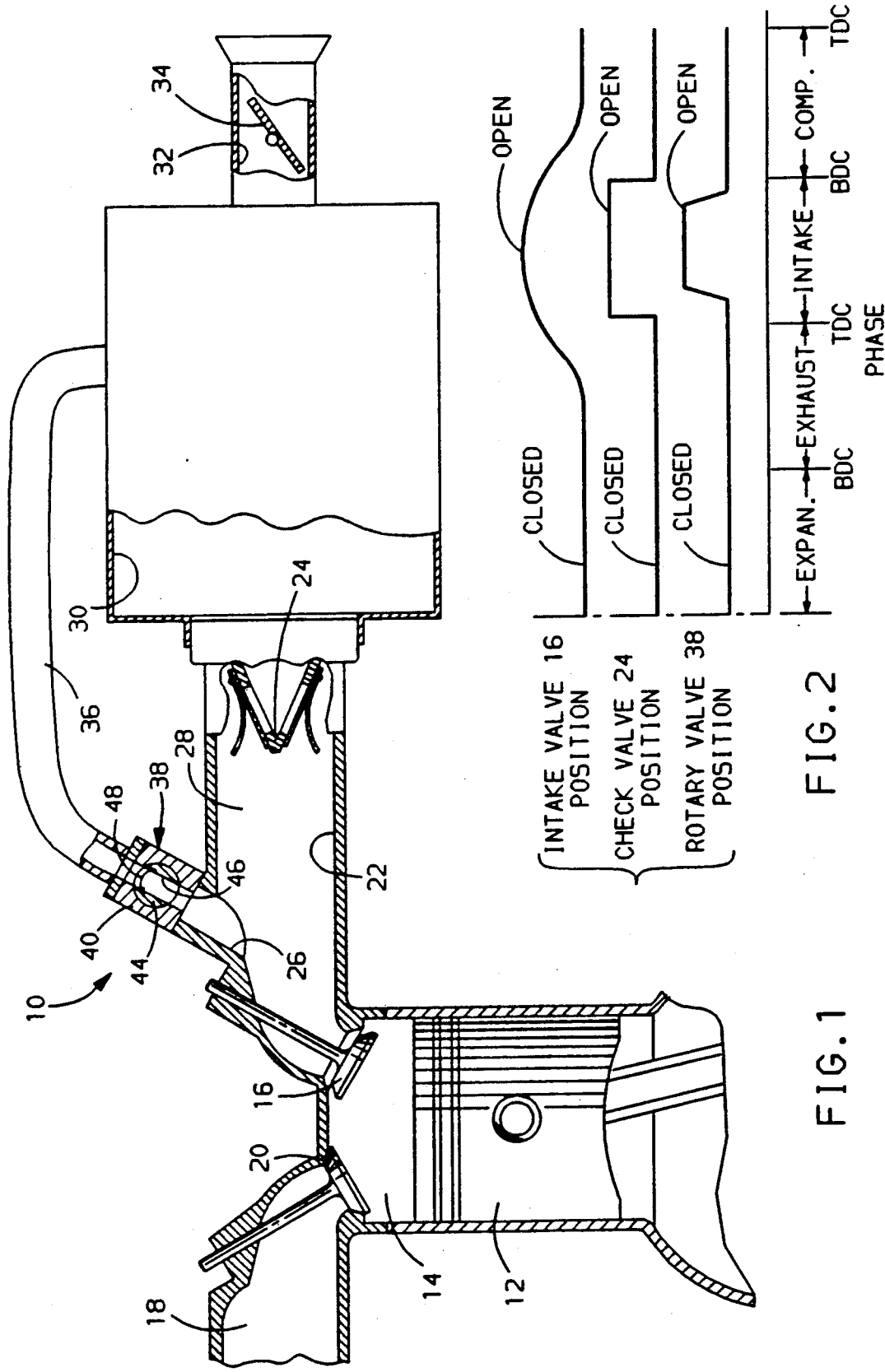

Referring to the drawings, and in particular FIG. 1, numeral 10 generally refers to an intermittent bypass system of the present invention connected to an engine. The intermittent bypass system 10 may be used with four-stroke, two-stroke, diesel, rotary valve and rotary engines.

The intermittent bypass system 10 comprises an intake conduit including an intake passage 22 leading to a cylinder 14 in the engine. An exhaust passage 18 leads away from the cylinder. A piston 12 is disposed in the cylinder. A check valve 24, such as a reed valve, is located in the intake passage 22. The check valve 24 allows fluid flow toward the cylinder 14 and obstructs fluid back-flow in the reverse direction.

The intermittent bypass system 10 further comprises an intake control means including an intake valve 16 seated in the intake passage 22 adjacent to cylinder 14. The intake valve 16 may comprise a poppet valve, as shown in FIG. 1, or a rotary valve. The intake control means may alternatively comprise a port formed on the side of the cylinder 14 which is connected to the intake passage 22. Such a port would be located on the cylinder 14 so that it is covered and uncovered by the reciprocating motion of the piston 12 in the cylinder 14 thereby providing control of the fluid flow into the cylinder, and providing an alternative to the intake valve 16.

A bypass port 26 is located on the intake passage 22 to provide a flow path to a downstream portion 28 defined by the portion of the intake passage between the check valve 24 and intake valve 16.

The intake conduit includes a plenum 30 connected to the inlet of the intake passage 22 and a throttle passage 32 leading to the plenum. The end of the throttle passage 32 opposite the plenum 30 leads to ambient air.

A throttle valve 34 is located in the throttle passage 32. The throttle valve 34 can have other locations, such as in the downstream portion 28 downstream of the connection of the secondary passage 36 thereto. The intermittent bypass system 10 may also be used with an engine which lacks a throttle valve 34.

A secondary passage 36 has one end connected to the bypass port 26 and the other end connected to a secondary fluid source comprising the plenum 30. The secondary passage 36 thereby enables communication between the plenum 30 and downstream portion 28. This allows air to flow from the plenum 30 through the secondary passage 36 and downstream portion 28 into the cylinder 14, thereby bypassing the check valve 24.

The other end of the secondary passage 36 can alternatively be connected to the throttle passage 32 adjacent its inlet, in which the pressure is approximately atmospheric. The secondary fluid source would then comprise the portion of the throttle passage 32 adjacent to the secondary passage 36. In such a construction, the throttle valve 34 is located in the throttle passage 32 downstream of the connection of the secondary passage 36 thereto. The throttle valve 34 can also be located adjacent to the connection of the secondary passage 36 to the throttle passage 32 so that the throttle valve can regulate the communication between the secondary passage and throttle passage thereby controlling the pressure in the portion of the throttle passage with which the secondary passage communicates. The other end of the secondary passage 36 can also be connected to the intake passage 22 upstream of the check valve 24.

A control valve means, comprising a rotary valve 38, is connected to the secondary passage 36. The rotary valve 38 includes a rotor housing 40 interposed in the secondary passage 36 so that a portion of the secondary passage coincides with the interior of the rotor housing. The rotor housing 40 can be connected at any location along the length of the secondary passage 36.

The rotary valve 38 further includes a rotor 44 in the rotor housing 40. The rotor 44 has a rotor passage 46 which aligns with the secondary passage 36 during a part of a revolution of the rotor thereby to enable the communication between the plenum 30 and downstream portion 28 (i.e., to open the rotary valve 38). During another part of the revolution of the rotor 44, the rotor obstructs the secondary passage 36 (i.e., to close the rotary valve 38).

The intermittent bypass system 10 preferably includes a valve controller which enables adjustment of the phasing of the opening of the rotary valve 38 (i.e., the part of an engine functional cycle during which the rotary valve is open), and adjustment of the duration of the opening of the rotary valve (i.e., the length of the part of the engine functional cycle during which the rotary valve is open). A mechanism for adjusting the phasing and duration of the opening of valve 38 is disclosed in U.S patent application Ser. No. 07/681,596 filed 8 Apr. 1991 entitled "Rotary Valve and System for Duration and Phase Control" and filed the same day as the present patent application.

The secondary passage 36 can include a throttle valve to control the pressure of the fluid entering into the downstream portion 28 from the secondary passage. Such a throttle valve would be desirable if the secondary fluid source were constituted by the portion of the throttle passage 32 upstream of the throttle valve 34 or by a source not connected to the throttle passage.

Operation

The operation of the intermittent bypass system 10 is illustrated as used with a four-stroke engine functional cycle. The four-stroke engine functional cycle, as shown in FIG. 2, comprises (i) an intake phase during which the piston 12 translates from top-dead-center (TDC) to bottom-dead-center (BDC) enabling air to flow from the downstream portion 28 into the cylinder 14, (ii) a compression phase during which the piston translates from BDC to TDC thereby compressing the gas in the cylinder, and during which the gas in the cylinder is normally ignited, (iii) an expansion phase during which the gas in the cylinder expands causing the piston to translate from TDC to BDC, and (iv) an exhaust phase during which the piston translates from BDC to TDC enabling exhaust gas to flow out of the cylinder.

Communication between the cylinder 14 and downstream portion 28 is regulated by the intake valve 16, although such communication can be regulated by means other than an intake valve. For example, the communication can be regulated by the piston 12 covering and uncovering the intake passage 22 as in a typical two-stroke engine. Also, it is possible to use the intermittent bypass system 10 with engine functional cycles other than a four-stroke, such as a two-stroke engine functional cycle.

The intake valve 16 preferably opens during the exhaust phase. During this phase, the exhaust valve 20 is typically open allowing gas in the cylinder 14 to flow into the exhaust passage 18. Since the pressure in the exhaust passage 18 is ordinarily greater than atmospheric, exhaust gas can flow from the exhaust passage through the cylinder 14 into the intake passage 22 when the exhaust and intake valves 20,16 are open simultaneously. If the pressure in the cylinder 14 exceeds the pressure in the downstream portion 28, then gas in the cylinder can also flow back into the downstream portion 28. Gas flow from the downstream portion 28 into the cylinder 14 begins when the pressure in the downstream portion exceeds the cylinder pressure. The intake valve 16 remains open during the intake phase allowing gas from the downstream portion 28 to flow into the cylinder 14.

The intake valve 16 preferably remains open during a portion of the compression phase. As long as the pressure in the downstream portion 28 is larger than the pressure in the cylinder 14, gas continues to flow into the cylinder from the downstream portion. If the pressure in the cylinder 14 becomes larger than the pressure in the downstream portion 28, as can occur during the compression phase, then gas can flow from the cylinder back into the downstream portion. After the intake valve 16 closes, the gas inside the cylinder 14 is compressed during the remainder of the compression phase.

The rotation of the rotor 44, indicated by the arrow 48, is timed with respect to the engine functional cycle so that the rotor passage 46 aligns with the secondary passage 36 to allow flow through the secondary passage 36 during the portion of the engine functional cycle when the pressure in the downstream portion 28 is less than the pressure in the secondary fluid source (i.e., the plenum 30). This allows air to flow from the plenum 30 through the secondary passage 36 into the downstream portion 28 to supplement the air flowing through the check valve 24 into the downstream portion. The rotor 44 may be rotatably coupled to a camshaft, which controls the opening of the intake valve 16, so that the opening of the rotary valve 38, with respect to the opening of the intake valve, is not affected by changes in the engine operating speed.

For the embodiment shown in FIG. 1, when the pressure in the plenum 30 is larger than the pressure in the downstream portion 28, there will also be air flow through the check valve 24 into the downstream portion. Thus, the rotation of the rotor 44 is timed so that the rotary valve 38 opens after the check valve 24 opens and closes before the check valve closes, as shown in FIG. 2.

The rotary valve 38 obstructs the secondary passage 36 during the portions of the engine functional cycle when the pressure in the plenum 30 is not greater than the pressure in the downstream portion 28. This prevents flow from the downstream portion 28, via the secondary passage 36, back into the plenum 30. Such flow can be substantial if the pressure in the downstream portion 28 is substantially larger than the pressure in the plenum 30. A large pressure can occur in the downstream portion 28 during parts of the exhaust and compression portions of the engine functional cycle when the intake valve 16 is open. Flow from the downstream portion 28 through the secondary passage 36 to the plenum 30 bypasses the check valve 24 thereby limiting its effectiveness in reducing fluid back-flow.

The portion of the engine functional cycle during which the pressure in the plenum 30 is larger than the pressure in the downstream portion 28 can vary depending on the engine speed and load. It may then be preferable to vary the portion of the engine functional cycle when the rotary valve 38 allows communication between the downstream portion 28 and plenum 30, via the secondary passage 36, so that the secondary passage is open during the entire period when the pressure in the plenum 30 is larger than the pressure in the downstream portion 28, and is obstructed during the remaining portions of the engine functional cycle. Adjustment of the phasing and duration of the communication via the secondary passage 36 can be made by a valve controller (described above with reference to U.S. patent application Ser. No. 07/681,596 filed 8 Apr. 1991) which enables control of the phasing and duration of the opening of the rotary valve 38.

Communication between the downstream portion and plenum 30, via the secondary passage 36, during portions of the engine functional cycle when the pressure in the downstream portion is larger than the plenum pressure is also possible. Such communication can be enabled by a valve controller (described above with reference to U.S. patent application Ser. No. 07/681,596 filed 8 Apr. 1991) which allows adjustment of the phasing and duration of the opening of the rotary valve 38. Communication during these portions of the engine functional cycle results in a reduced pressure in the downstream portion 28 and, depending on the portion of the engine functional cycle during which the intake and exhaust valves 16, 20 are open, can result in increased fluid back-flow from the cylinder 14 into the downstream portion 28.

For example, if the intake valve 16 opens during the exhaust phase when the exhaust valve 20 is open, and the pressure in the downstream portion 28 is sufficiently reduced, then exhaust gas can flow from the cylinder 14 back into the downstream portion 28 instead of being exhausted into the exhaust passage 18. Such exhaust gas ordinarily reenters the cylinder 14 during the next intake phase. Under some engine operating conditions, adding exhaust gas to the fuel and air in the cylinder 14 can improve the combustion therein.

It is also possible to use the intermittent bypass system 10 to control the air flow to the cylinder 14 during low engine operating speeds and loads. This can be accomplished by connecting the secondary passage 36 to the throttle passage 32 either upstream of or adjacent to the throttle valve 34. During low engine operating speeds and loads, the throttle valve 34 is closed to obstruct substantially all of the air flow into the cylinder 14 via the check valve 24 so that substantially all of the air is supplied to the cylinder via the secondary passage 36. The air flow through the secondary passage 36 is controlled by the rotary valve 38. If the secondary passage 36 is connected to the throttle passage 32 adjacent to the throttle valve 34, then the air flow through the secondary passage can be further controlled by adjusting the throttle valve 34 to vary the pressure in the portion of the throttle passage with which the secondary passage communicates.

It is also possible to control the pressure in the downstream portion 28 when the intake valve 16 is closed using the intermittent bypass system 10, in a manner similar to that described in U.S. patent application Ser. No. 534986 filed 8 Jun. 1990, now U.S. Pat. No. 4991547, the disclosure of which is hereby incorporated by reference. The rotation of the rotor 44, indicated by the arrow 48, is timed with respect to the engine functional cycle so that the rotor passage 46 aligns with the secondary passage 36 during the portion of the engine functional cycle when the intake valve 16 is closed.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An intermittent bypass system comprising:
    an intake conduit including an intake passage leading to a cylinder in an engine;
    an intake control means connected to said intake passage adjacent to the cylinder, said intake control means enabling, during different portions of an engine functional cycle, fluid flow from said intake passage into the cylinder, fluid back-flow from the cylinder into said intake passage, and obstruction of fluid flow between said intake passage and the cylinder;

a check valve in said intake passage upstream of said intake control means, said check valve being adapted to open during a portion of the engine functional cycle to allow fluid flow through said intake passage toward the cylinder, said check valve being further adapted to close during the portion of the engine functional cycle when there is no fluid flow through said check valve toward the cylinder thereby obstructing fluid back-flow through said intake passage in the reverse direction the obstruction to fluid back-flow by said check valve enabling the pressure in said intake passage downstream of said check valve to become larger than the pressure in said intake passage upstream of said check valve during portions of the engine functional cycle;

a bypass port located on said intake passage to provide a flow path to a downstream portion defined by the portion of said intake passage between said check valve and intake control means; and a control valve means connected between a secondary fluid source and said bypass port, said secondary fluid source comprising a portion of said intake conduit upstream of said check valve, said control valve means being operated in synchronization with the engine functional cycle to enable communication between the secondary fluid source and said downstream portion during the portion of the engine functional cycle when said check valve is open, the synchronization of said control valve means with the engine functional cycle further enabling said control valve means to obstruct said communication during the portion of the engine functional cycle when said check valve is closed.

2. An intermittent bypass system as set forth in claim 1 wherein said control valve means comprises:

a secondary passage connected between the secondary fluid source and said bypass port enabling said communication; and a rotary valve including a rotor housing interposed in said secondary passage so that a portion of said secondary passage coincides with the interior of said housing, said rotary valve further including a rotor within said rotor housing, said rotor having a rotor passage which, when said rotor rotates, aligns with said secondary passage during a part of a revolution of said rotor to allow said communication, said rotor obstructing said secondary passage during another part of said revolution to obstruct said communication.

3. An intermittent bypass system as set forth in claim 1 wherein the portion of said intake conduit which constitutes the secondary fluid source comprises a plenum connected to said intake passage upstream of said check valve.

4. An intermittent bypass system as set forth in claim 1 wherein said control valve means allows said communication during a portion of the engine functional cycle during which the following conditions exist simultaneously: the pressure in the secondary fluid source is larger than the pressure in said downstream portion, the pressure in said downstream portion is larger than the pressure in the cylinder, and said intake control means enables fluid flow from said intake passage into the cylinder; said control valve means obstructing said communication during the remaining portions of the engine functional cycle.

5. An intermittent bypass system comprising:

an intake conduit including an intake passage leading to a cylinder in an engine;

an intake control means connected to said intake passage adjacent to the cylinder, said intake control means enabling, during different portions of an engine functional cycle, fluid flow from said intake passage into the cylinder, fluid back-flow from the cylinder into said intake passage, and obstruction of fluid flow between said intake passage and the cylinder;

a check valve in said intake passage upstream of said intake control means, said check valve being adapted to open during a portion of the engine functional cycle to allow fluid flow through said intake passage toward the cylinder, said check valve being further adapted to close during the portion of the engine functional cycle when there is no fluid flow through said check valve toward the cylinder thereby obstructing fluid back-flow through said intake passage in the reverse direction, the obstruction to fluid back-flow by said check valve enabling the pressure in said intake passage downstream of said check valve to become larger than the pressure in said intake passage upstream of said check valve during portions of the engine functional cycle;

a bypass port located on said intake passage to provide a flow path to a downstream portion defined by the portion of said intake passage between said check valve and intake control means; and a control valve means connected between a secondary fluid source and said bypass port, said control valve means being operated in synchronization with the engine functional cycle to enable said communication between the secondary fluid source and said downstream portion during a portion of the engine functional cycle when said intake control means obstructs fluid flow between said intake passage and the cylinder, the synchronization of said control valve means with the engine functional cycle further enabling said control valve means to obstruct said communication during the entire portion of the engine functional cycle when said intake control means enables fluid flow between said intake passage and the cylinder.

6. An intermittent bypass system as set forth in claim 5 wherein said control valve means comprises:

a secondary passage connected between the secondary fluid source and said bypass port enabling said communication; and a rotary valve including a rotor housing interposed in said secondary passage so that a portion of said secondary passage coincides with the interior of said housing, said rotary valve further including a rotor within said rotor housing, said rotor having a rotor passage which, when said rotor rotates, aligns with said secondary passage during a part of a revolution of said rotor to allow said communication, said rotor obstructing said secondary passage during another part of said revolution to obstruct said communication.

* * * * *